United States Patent
Dhawan et al.

(10) Patent No.: US 12,003,670 B2
(45) Date of Patent: Jun. 4, 2024

(54) SYSTEM AND METHOD FOR REDIRECTING INBOUND-VOICE-INTERACTIONS TO DIGITAL CHANNELS IN A CONTACT CENTER

(71) Applicant: inContact INC., Sandy, UT (US)

(72) Inventors: Salil Dhawan, Pune (IN); Omkar Joglekar, Pune (IN); Rahul Vyas, Rajasthan (IN)

(73) Assignee: INCONTACT INC., Sandy, UT (US)

( * ) Notice: Subject to any disclaimer, the term of this patent is extended or adjusted under 35 U.S.C. 154(b) by 0 days.

(21) Appl. No.: 18/129,867

(22) Filed: Apr. 2, 2023

(65) Prior Publication Data

US 2023/0379410 A1 Nov. 23, 2023

Related U.S. Application Data

(63) Continuation of application No. 17/746,992, filed on May 18, 2022, now Pat. No. 11,647,120.

(51) Int. Cl.
*H04M 3/00* (2024.01)
*G06F 17/11* (2006.01)
*H04M 3/51* (2006.01)
*H04M 3/523* (2006.01)

(52) U.S. Cl.
CPC ........... *H04M 3/5237* (2013.01); *G06F 17/11* (2013.01); *H04M 3/5175* (2013.01); *H04M 3/5238* (2013.01); *H04M 2203/255* (2013.01); *H04M 2203/408* (2013.01); *H04M 2203/551* (2013.01); *H04M 2203/558* (2013.01)

(58) Field of Classification Search
CPC ... G06F 17/11; H04M 3/5237; H04M 3/5175; H04M 3/5238
See application file for complete search history.

(56) References Cited

U.S. PATENT DOCUMENTS

2023/0090049 A1\* 3/2023 Elango ................ H04M 3/5231
705/7.16

\* cited by examiner

*Primary Examiner* — Rasha S Al Aubaidi
(74) *Attorney, Agent, or Firm* — SOROKER AGMON NORDMAN RIBA; Liat Lin (57) ABSTRACT

A computerized-method for redirecting inbound-voice-interactions to digital channels in a contact center, is provided herein. The computerized-method includes: (i) operating a digital-qualifier module to determine a digital-medium-transition-quotient, of an inbound-voice-interaction of a customer in an inbound-queue. The digital-medium-transition-quotient is an indication of a level of suitability of a digital-communication-channel to resolve a customer issue; (ii) operating an interaction-redirection module to determine a digital-communication-channel for redirection of the inbound-voice-interaction, based on customer-preference and the determined digital-medium-transition-quotient; and (iii) forwarding the inbound-voice-interaction and the determined digital-communication-channel to an Automatic Call Distribution (ACD) system to be carried-out by an agent via the determined digital-communication-channel when the determined digital-medium-transition-quotient is above a preconfigured threshold.

10 Claims, 9 Drawing Sheets

| Use-case | Digital Medium Transition Quotient (DMTQ >=80% qualifies call switching to a digital channel | Inference |
|---|---|---|
| Debit card blocked | 85% | The customer need not waiting in call queue as DMTQ is above 80% and such query qualifies to be resolved via digital channels |
| Car service appointment | 89% | The customer can indicate the preference or schedule using digital channel and no need waiting in call queue |

| Input | Digital Medium Transition Quotient | Redirect to Digital Channel | Customer Preferred Channel |
|---|---|---|---|
| Query 1 | 94 | Yes | Whatsapp |
| Query 2 | 70 | No | Twitter |
| Query 3 | 71 | No | Facebook |
| Query 4 | 89 | Yes | Link Sent -> Instagram received as reply |
| Query 5 | 92 | Yes | Twitter |
| Query 6 | 82 | No | Chat |
| Query 7 | 91 | Yes | Facebook |
| Query 8 | 88 | Yes | Twitter |
| Query 9 | 57 | No | Facebook |
| Query 10 | 96 | Yes | Chat |

SYSTEM AND METHOD FOR REDIRECTING INBOUND-VOICE-INTERACTIONS TO DIGITAL CHANNELS IN A CONTACT CENTER

RELATED APPLICATIONS

This application claims priority as a continuation from application Ser. No. 17/746,992 dated May 18, 2022, the disclosure of which is incorporated herein by reference

TECHNICAL FIELD

The present disclosure relates to the field of data analysis and more specifically to redirecting inbound-voice-interactions to digital channels in a contact center.

BACKGROUND

When a contact center can address customer issues and concerns quickly, it creates better experiences and happier customers. This may substantially increase contact center performance by improving agent productivity and utilization as agents can now serve customers queries effectively. According to a management consulting firm, Bain & Co, the creators of Net promoter score (NPS), "5% increase in customer retention produces more than a 25% increase in profit."

In a multichannel contact center, customers may interact with agents over several communication channels via digital channels. As transactional queries move to digital channels, contact center agents have more time available to provide valuable service to customers. However, it is a challenge for a contact center to adapt to and embrace digital channels. Also, a migration of the contact center demand to digital channels may be essential for digital strategy delivery and maintenance of a competitive edge.

A digital strategy and proactive contact approach that uses both digital and traditional channels may improve the level of customer satisfaction as well as sales revenue. Contact centers should use their ability to look across customer journey and intervene when possible and redirect inbound voice interactions to be carried out via digital channels where agents may simultaneously provide service for several customers.

Current solutions in contact centers don't have a mechanism which gathers the customer interactions that are waiting in an inbound-queue, along with respective queue time, and analyze customer provided inputs related to the interaction, customer past transaction history and utilize those parameters to filter out interactions to be redirected to available digital-communication-channels for query resolution.

Therefore, to improve the efficiency of contact centers, for example, by increasing the adoption of digital channels thus, improving agent productivity and utilization rates, to increase customer engagement and satisfaction, e.g., improved Net Promoter Score (NPS) and to reduce costs, there is a need for a technical solution that will expedite the adoption of digital communication in contact centers by redirecting inbound-voice-interactions to digital channels.

Additionally, there is a need to provide a gamification application in contact centers to keep track of the customers which have shown a tendency towards digital channel adoption and accordingly, to provide the customers with rewards and recognition.

SUMMARY

There is thus provided, in accordance with some embodiments of the present disclosure, a computerized-method for redirecting inbound-voice-interactions to digital channels in a contact center.

Furthermore, in accordance with some embodiments of the present disclosure, the computerized-method may include (i) operating a digital-qualifier module to determine a digital-medium-transition-quotient, of an inbound-voice-interaction of a customer in an inbound-queue. The digital-medium-transition-quotient may be an indication of a level of suitability of a digital-communication-channel to resolve a customer issue; (ii) operating an interaction-redirection module to determine a digital-communication-channel for redirection of the interaction, based on customer-preference and the determined digital-medium-transition-quotient; and (iii) forwarding the inbound-voice-interaction and the determined digital-communication-channel to an Automatic Call Distribution (ACD) system to be carried-out by an agent via the determined digital-communication-channel when the determined digital-medium-transition-quotient is above a preconfigured threshold.

Furthermore, in accordance with some embodiments of the present disclosure, the customer-preference may be determined by a customer-identity-mapper module. The customer-identity-mapper module may include retrieving customer-preference from a file management system.

Furthermore, in accordance with some embodiments of the present disclosure, when there is no information as to customer preferences, the computerized-method may further include operating a notification module, the notification module may include: (i) sending a preference-selection message to the customer via a communication digital channel; and (ii) receiving from the customer a selected customer-preference of digital-communication-channel.

Furthermore, in accordance with some embodiments of the present disclosure, the digital-medium-transition-quotient may be calculated by formula I:

$$\text{digital-medium-transition-quotient} \propto \text{digital\_skill\_tuple} * \text{interaction\_tuple} * \text{customer\_tuple} \quad \text{(I)}$$

Furthermore, in accordance with some embodiments of the present disclosure, the interaction_tuple may be calculated by formula II:

$$\text{interaction\_tuple} = \{\text{wait time}, \text{interaction context}\} = \Pi_{i=1}^{n}(\text{interaction tuple})i \quad \text{(II)}$$

whereby n is a number of parameters,
wait time is a length of time an inbound-interaction has to wait in an interaction queue before an agent answers the inbound-interaction,
interaction context is a boolean parameter that indicates if there is data related to the inbound-interaction, it's value is '1' when there is data and '0' otherwise.

Furthermore, in accordance with some embodiments of the present disclosure, the customer_tuple may be calculated by formula III:

$$\text{customer\_tuple} = \{\text{customer sentiment}, \text{customer segment}, \text{customer abandonment rate}, \text{customer ticket history}, \text{customer history on digital channels}\} = \Pi_{i=1}^{n}(\text{customer touple})i \quad \text{(III)}$$

whereby n is a number of parameters,
customer sentiment is a score of last inbound-voice-interaction responded in the contact center,
customer segment is a customer priority, customer abandonment rate is a percentage of customer inbound-voice-interactions which have been abandoned from the inbound-queue during a preconfigured period, customer ticket history is a number of times the customer has approached the contact center to resolve the customer issue of the inbound-voice-interaction, customer history on digital channels is a level of success of previous customer inbound-voice-interactions.

Furthermore, in accordance with some embodiments of the present disclosure, the digital_skill_tuple may be calculated by formula IV:

$$\text{Digital skill Tuple} = \begin{cases} 1; & \text{relevant agents skills available} \\ 0; & \text{otherwise} \end{cases} \quad \text{(IV)}$$

whereby:

relevant agents skills available indicates if there are available agents having relevant skills to the interaction context.

Furthermore, in accordance with some embodiments of the present disclosure, the computerized-method may further include operating a gamification module.

Furthermore, in accordance with some embodiments of the present disclosure, the gamification module may include: (i) adding a preconfigure number of points to a customer for a redirected voice-inbound-interaction to be stored in a redirection-data-points database; (ii) comparing a number of points of the customer to a preconfigured threshold to send a reward to the customer when the number of points is above the preconfigured threshold.

Furthermore, in accordance with some embodiments of the present disclosure, the computerized-method may further include generating a report upon user selection via a Graphical User Interface (GUI) associated to a user dashboard application to be presented on a user dashboard via a display unit.

Furthermore, in accordance with some embodiments of the present disclosure, the generated report may include at least one of: (i) number of voice-interactions redirected to a digital channel in a preconfigured period; (ii) percentage of redirected voice interactions to total inbound interactions during the preconfigured period; and (iii) skillset associated to the determined digital-communication-channel.

Furthermore, in accordance with some embodiments of the present disclosure, a forwarded inbound-voice-interaction to the ACD system to be carried-out by an agent via the determined digital-communication-channel is tagged as 'redirected to digital channel' in a file management system.

Furthermore, in accordance with some embodiments of the present disclosure, there is further provided a computerized-system for redirecting inbound-voice-interactions to digital channels in a contact center.

Furthermore, in accordance with some embodiments of the present disclosure, the computerized-system may include one or more processors, and a memory to store one or more databases thereon.

Furthermore, in accordance with some embodiments of the present disclosure, for each inbound-voice-interaction of a customer in an inbound-queue, the one or more processors may be configured to: (i) operate a digital-qualifier module to determine a digital-medium-transition-quotient. The digital-medium-transition-quotient may be an indication of a level of suitability of a digital-communication-channel to resolve a customer issue; (ii) operate an interaction-redirection module to determine a digital-communication-channel for redirection of the interaction, based on customer-preference and the determined digital-medium-transition-quotient; and (iii) forward the inbound-voice-interaction and the determined digital-communication-channel to an Automatic Call Distribution (ACD) system to be carried-out by an agent via the determined digital-communication-channel when the determined digital-medium-transition-quotient is above a preconfigured threshold.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "digital channel" refers to a communication platform to provide service to customers in a contact center which may be implemented as agent service. For example, chat, Short Message Service (SMS), email and the like.

"The term redirecting to digital channels" as used herein refers to forwarding interactions to be carried out by an agent via a digital channel.

The terms digital channel and digital-communication-channel" are interchangeable.

To overcome demand of inbound-voice interactions in contact centers and to save agents costs, there is a need for a technical solution for redirecting inbound-voice interactions to be carried out via digital channels where agents may simultaneously provide service for several customers.

Figure 1A:
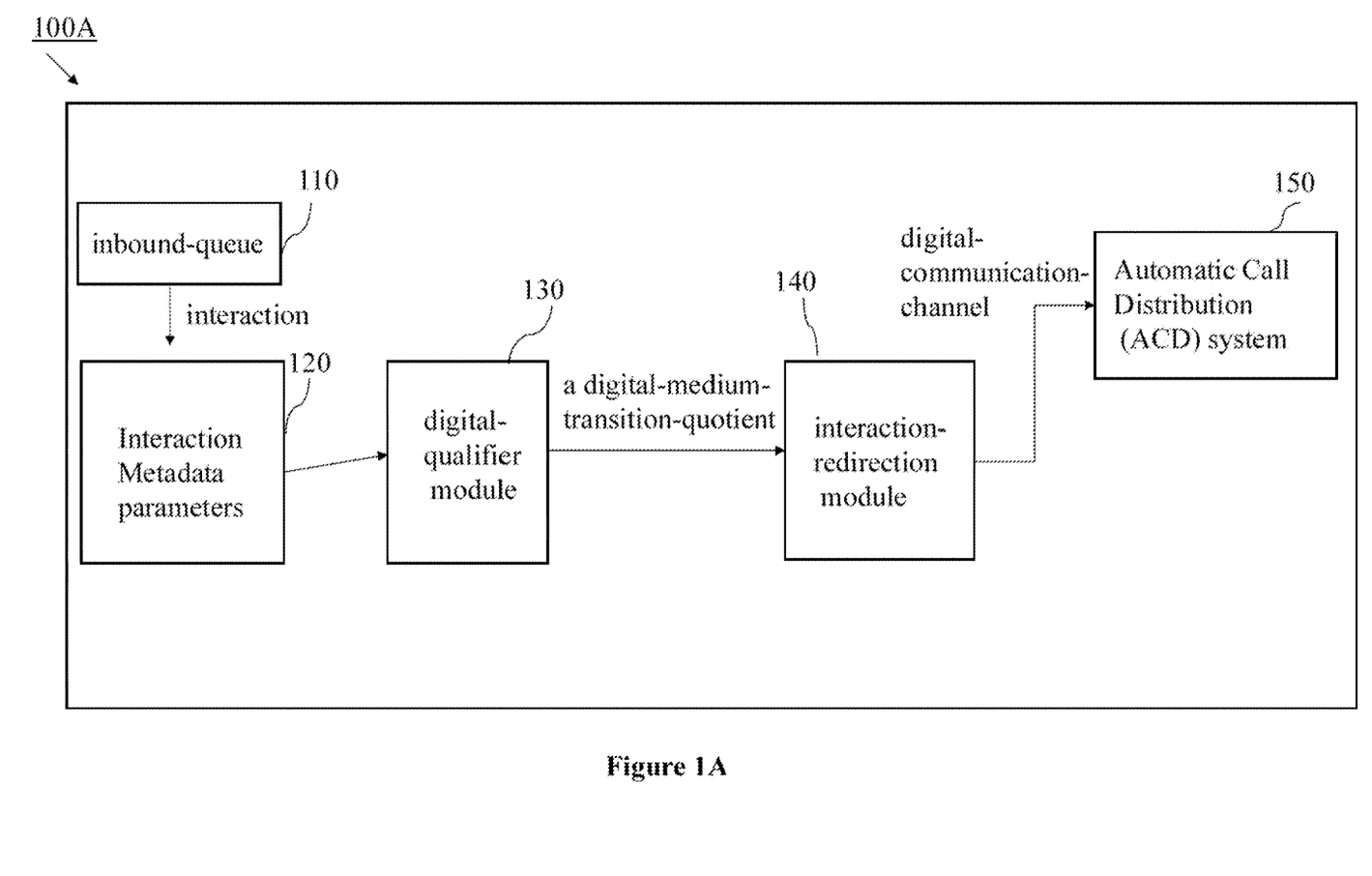
FIGS. 1A-1B schematically illustrate a high-level diagram of a system for redirecting inbound-voice-interactions to digital channels in a contact center, in accordance with some embodiments of the present disclosure.

FIG. 1A schematically illustrates a high-level diagram of a system 100A for redirecting inbound-voice-interactions to digital channels in a contact center, in accordance with some embodiments of the present disclosure.

Figure 2:
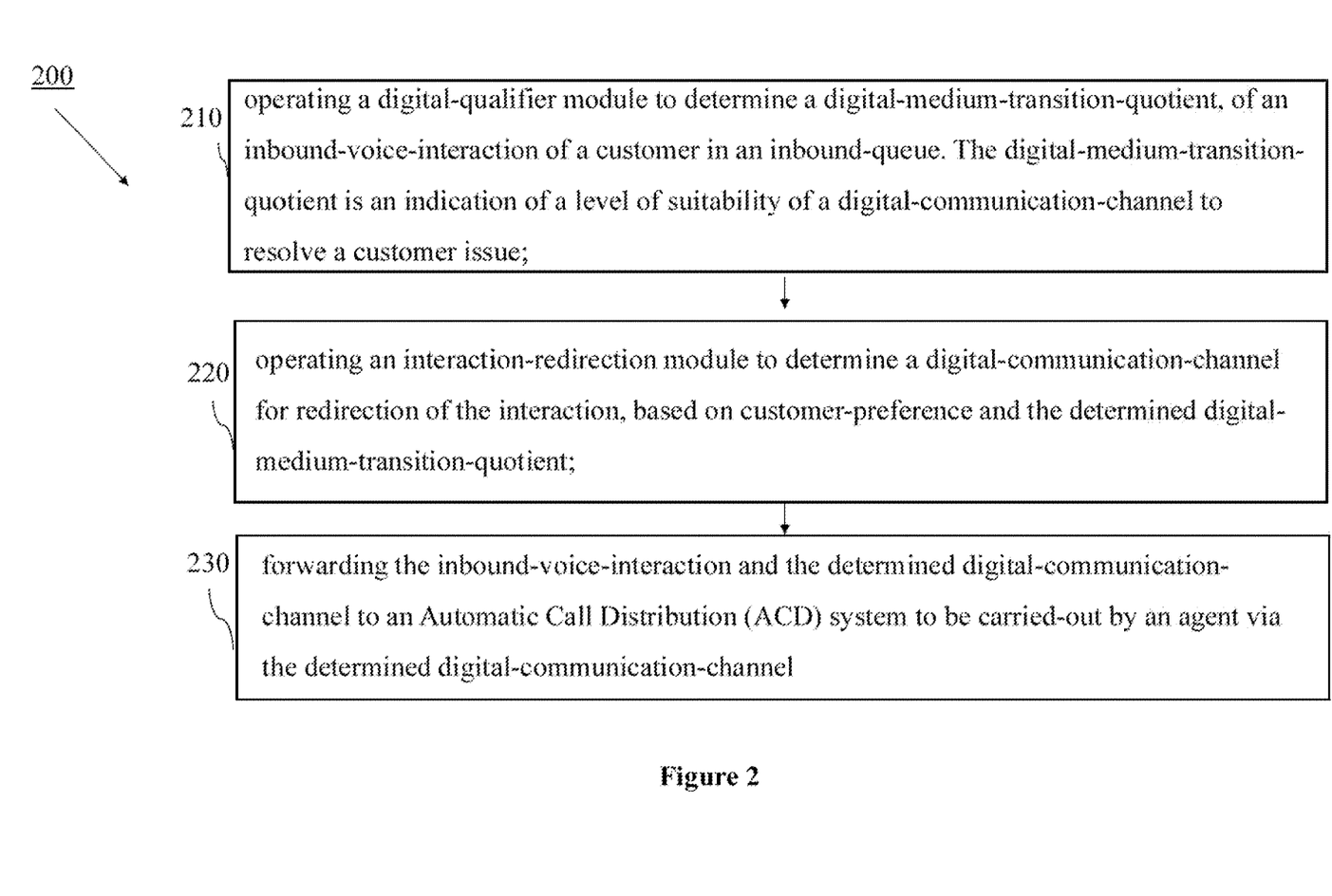
FIG. 2 is a high-level workflow of a for a computerized-method for redirecting inbound-voice-interactions to digital channels in a contact center, in accordance with some embodiments of the present disclosure.

According to some embodiments of the present disclosure, in a system, such as system 100A, one or more processors (not shown) may implement a computerized-method, such as computerized-method 200 in FIG. 2, for redirecting inbound-voice-interactions to digital channels in a contact center.

According to some embodiments of the present disclosure, a module, such as a digital-qualifier module 130 may be operated to determine a digital-medium-transition-quotient, of an inbound-voice-interaction of a customer that is waiting in an inbound-queue 110. The digital-qualifier module 130 may take into consideration factors related to the inbound-voice interaction, and past customer interaction history to determine a 'Digital Medium Transition Quotient' (DMTQ) for the inbound-voice interaction.

According to some embodiments of the present disclosure, the digital-medium-transition-quotient may be an indication of a level of suitability of a digital-communication-channel to resolve a customer issue of the inbound-voice interaction. Interaction metadata parameters 120 of the inbound-voice-interaction of the customer may be provided to the digital-qualifier module 130, such as interaction context and wait time.

According to some embodiments of the present disclosure, the interaction metadata parameters 120 of the inbound-voice-interaction of the customer may further include queuing period, customer sentiment, customer segment, customer abandonment rate, customer ticket history, customer history on digital channels, wait time, interaction context, skill for query context and the like.

According to some embodiments of the present disclosure, digital-medium-transition-quotient is proportional or equals to the product of digital skill tuple, interaction tuple and customer tuple.

According to some embodiments of the present disclosure, the digital-medium-transition-quotient may be calculated by formula I:

digital-medium-transition-quotient∞digital_skill_tuple*interaction_tuple*customer_tuple(I)

whereby:
the interaction_tuple may be calculated by formula II:

$$\text{interaction\_tuple} = \{\text{wait time, interaction context}\} = \Pi_{i=1}^{n}(\text{interaction tuple})i \quad \text{(II)}$$

whereby n is a number of parameters,
wait time may be a length of time an inbound-interaction has to wait in an interaction queue before an agent answers the inbound-interaction,
interaction context may be a boolean parameter that indicates if there is data related to the inbound-interaction, it's value is '1' when there is data and '0' otherwise,
the customer_tuple may be calculated by formula III:

$$\text{customer\_tuple} = \{\text{customer sentiment, customer segment, customer abandonment rate, customer ticket history, customer history on digital channels}\} = \Pi_{i=1}^{n}(\text{customer\_tuple})i, \quad \text{(III)}$$

whereby n is a number of parameters,
customer sentiment may be a score of last inbound-voice-interaction responded in the contact center,
customer segment may be a customer priority,
customer abandonment rate may be a percentage of customer inbound-voice-interactions which have been abandoned from the inbound-queue during a preconfigured period,
customer ticket history may be a number of times the customer has approached the contact center to resolve the customer issue of the inbound-voice-interaction,
customer history on digital channels may be a level of success of previous customer inbound-voice-interactions.
the digital_skill_tuple may be calculated by formula IV:

$$\text{digital skill tuple} = \begin{cases} 1; & \text{relevant agents skills available} \\ 0; & \text{otherwise} \end{cases} \quad \text{(IV)}$$

whereby:
relevant agents skills available indicates if there are available agents having relevant skills to the interaction context.

According to some embodiments of the present disclosure, the digital skill tuple may be used as a filter before an inbound-interaction is redirected to a digital communication channel. When the relevant skillset required to resolve the query of the inbound-interaction is available, e.g., there are available agents in the contact center having the required skillset, then the voice inbound-interaction may be redirected to a digital channel. If the relevant skillset is not available, then the value of the digital-medium-transition-quotient may be zeroed, as there's no point in redirecting the inbound-interaction to a digital channel if the relevant skillset is not available.

According to some embodiments of the present disclosure, the wait time parameter in the interaction tuple in formula II, may relate to the length of time an inbound-interaction has to wait in an interaction queue before an agent answers the inbound-interaction. The wait time may be measured in minutes. The wait time parameter is dependent on many factors including resolution time of current calls which are associated to an agent, drop rate of current calls in interactions queue, such as the inbound-queue 110 and the number of available agents to handle inbound customer calls. The value of wait time parameter may change over time and may be dynamically tracked by any soft phone or hard phone application. Once the interaction has been completed, the wait time value of the completed interaction of the customer may be stored in a database, such as interactions data store.

According to some embodiments of the present disclosure, the interaction context in the interaction tuple may relate to a context of a current ongoing interaction. The interaction context may indicate if there is data, such as details related to an ongoing interaction of a customer with the contact center including query issue, how many past interactions have occurred with the customer regarding that query issue, any additional details that the customer has provided via Interactive Voice Response (IVR) prompts and contact center response to these IVR details. In general, the interaction context may relate to all minute details which were received both from customer and contact center side regarding the interaction. When the interaction context exists the value of interaction context equals '1' otherwise it is '0'.

According to some embodiments of the present disclosure, the interaction tuple may positively influence the digital-medium-transition-quotient when customer query context is clear, i.e., when there is information as to customer issue and the queue time, e.g., wait time is relatively high, thus contributing to a high digital-medium-transition-quotient which means that the customer issue may be qualified for the redirecting to a digital channel.

According to some embodiments of the present disclosure, the interaction tuple is a product of wait time and interaction context. When there is information as to customer issue i.e., interaction context equals '1' and the wait time parameter in the inbound-queue 110 is high. e.g., above a preconfigured threshold, then the interaction may be qualified for redirection to a digital channel. For example, for a customer issue, such as a change of phone number against savings account, the contact center may take into consideration the interaction context and the corresponding wait time parameter after which the interaction has been resolved by the agent. In case the wait time parameter is high, and the interaction context exists, i.e., interaction context equals '1', such interactions may be suitable for redirection to a digital channel.

According to some embodiments of the present disclosure, the customer sentiment parameter in the customer tuple in formula III may relate to customer sentiment during last interaction. The last interaction may be the last immediate interaction which a customer has had with the contact center. The customer segment in the customer tuple may relate to a priority of the customer, e.g., Small-Medium Size (SMB), premier, key and the like. For example, the value of customer segment may be based on priority of the customer, such as SMB—'3', premier—'2', and key—'1'. The customer abandonment rate parameter in the customer tuple may relate to a percentage of customer calls which have been previously abandoned from the inbound-queue 110.

According to some embodiments of the present disclosure, customer ticket history parameter, in the customer tuple, may relate to the history of customer ticket. The customer ticket history parameter may relate to details about past interactions or communications with the contact center which are listed in the customer ticket. For example, a customer may approach a contact center at the third time to resolve an issue related to the customer account debited but the transactions did not go through, accordingly the customer ticket history parameter may take all the details regarding customer ticket, into considerations. The value of the customer ticket history may be determined as '1' as a default value when there is no history available, and the current inbound interaction will be saved as history. If there is customer ticket history then the value of the parameter may be determined based on the number of previous interactions plus '1', e.g., in case there were two previous interactions then the value would be '3'.

The customer history on digital channels in the customer tuple may relate to a level of success of previous customer interactions in digital channels. The level of success of previous customer interactions in digital channels may be retrieved from the contact center systems.

According to some embodiments of the present disclosure, for example, a calculation of customer tuple may be based on the following values: customer sentiment '1', customer segment '2', customer abandonment rate '3', customer ticket history '3' and customer history on digital channels '2', customer tuple=1*2*3*3*2=36.

According to some embodiments of the present disclosure, the customer tuple may positively influence the digital-medium-transition-quotient, for example, when customer has history for digital channels and previous historical customer sentiment was not bad. Then a high digital-medium-transition-quotient which means that the customer issue may be qualified for the redirecting to a digital channel.

According to some embodiments of the present disclosure, the customer_tuple is a product of customer sentiment, customer abandonment rate, customer history on digital channel. The customer_tuple may relate to customer specific parameters of abandonment rate in customer's past preconfigured 'k' interactions. The customer sentiment corresponds to the 'k' interactions, history of current customer ticket, when there is an open ticket. The product of the parameters may be an indication of a level of efficiency or competency that the customer tickets have been handled by the contact center.

According to some embodiments of the present disclosure, the skill for query context parameter in the digital_skill_tuple may relate to the availability of a skilled agent to handle a given customer query on a digital channel medium.

According to some embodiments of the present disclosure, the digital_skill_tuple is a boolean parameter, which indicates if there are available agents having relevant skills to the context of the inbound-interaction to respond the inbound-voice-interaction on a digital channel. When there is an agent with relevant skills for the query context in the contact center the value is '1' otherwise it is '0'. For example, if there is a call in the inbound-queue 110 with an issue such as 'credit card' then, the value of the digital-medium-transition-quotient (DMTQ) may include an indication if an agent with related skills is available on digital channel to revert to the customer query. The check for the agent with the related skills may be performed by a module, such as the digital-qualifier module 130.

According to some embodiments of the present disclosure, the digital-qualifier module 130 may send the determined digital-medium-transition-quotient to a module, such as interaction-redirection module 140.

According to some embodiments of the present disclosure, the interaction-redirection module 140 may take into account customer preference for a digital channel and the digital-medium-transition-quotient (DMTQ) from the digital-qualifier module 130 to determine a digital channel to which the inbound-voice interaction has to be redirected via the ACD system 150.

According to some embodiments of the present disclosure, the interaction-redirection module 140 may be operated to determine a digital-communication-channel for redirection of the inbound-voice interaction, based on customer-preference and the determined digital-medium-transition-quotient.

According to some embodiments of the present disclosure, the inbound-voice-interaction and the determined digital-communication-channel may be forwarded to an Automatic Call Distribution (ACD) system 150 to be carried-out by an agent via the determined digital-communication-channel. Meaning, the inbound-voice-interaction will be carried out via the determined digital-communication-channel when the digital-communication-channel may be above a predefined threshold.

According to some embodiments of the present disclosure, a forwarded inbound-voice-interaction an ACD system 150 to be carried-out by an agent via the determined digital-communication-channel may be tagged as 'redirected to digital channel' in a file management system (not shown), such as Customer Relationship Management (CRM) system.

Figure 1B:
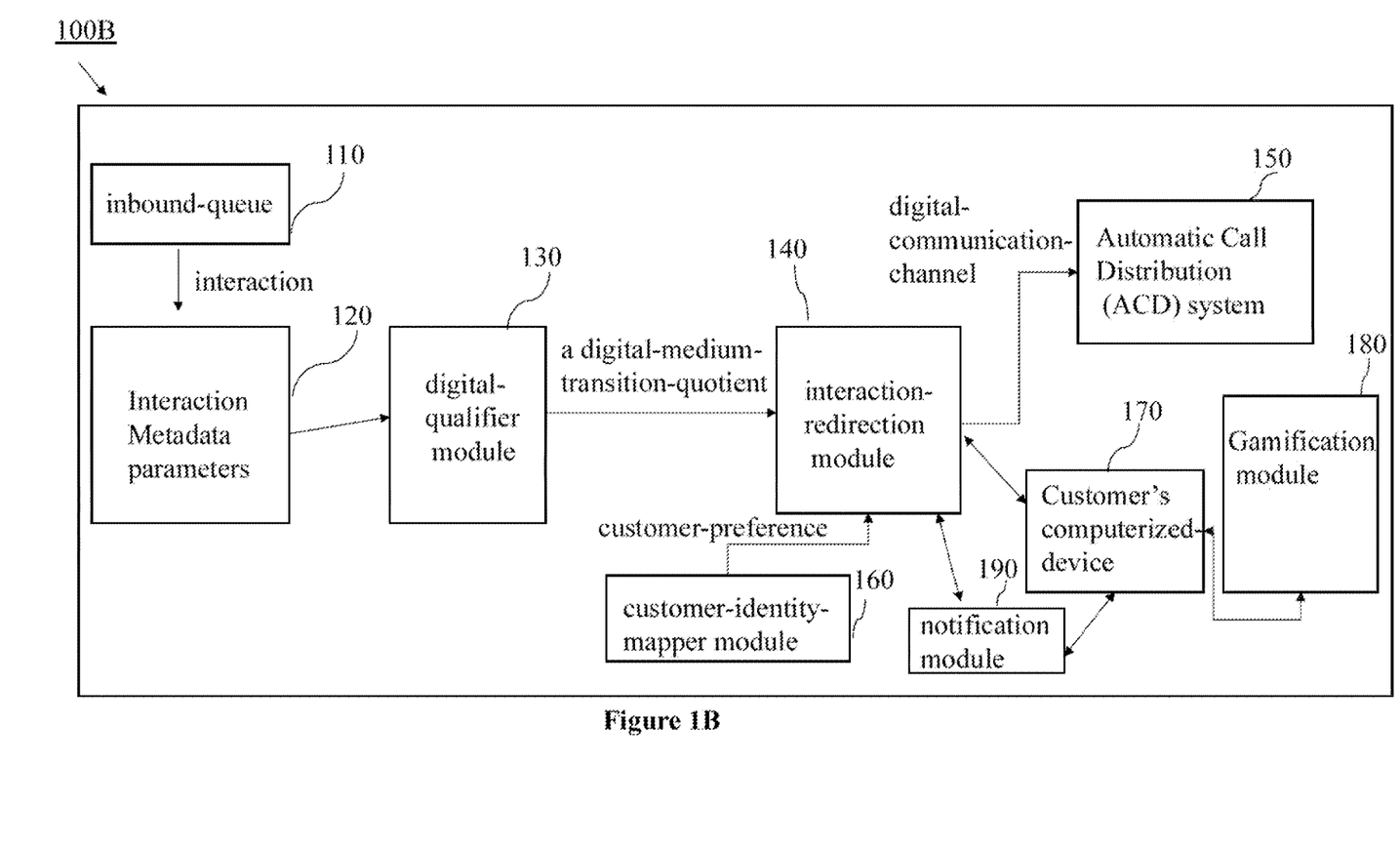

FIG. 1B schematically illustrates a high-level diagram of a system 100B for redirecting inbound-voice-interactions to digital channels in a contact center, in accordance with some embodiments of the present disclosure.

According to some embodiments of the present disclosure, a system, such as system 100B may include the same components as system 100A, in FIG. 1A, an inbound-queue 110, interaction metadata parameters 120, a digital qualifier module 130, an interaction redirection module 140 and an ACD system 150.

According to some embodiments of the present disclosure, the customer-preference may be determined by a module, such as customer-identity-mapper module 160. The customer-identity-mapper module 160 may include retrieving customer-preference from a file management system (not shown), such as CRM system.

According to some embodiments of the present disclosure, when there is no information as to customer preferences in the file management system, a module, such as a notification module 190 may be operated. The notification module 190 may include: (i) sending a preference-selection message to the customer via a communication digital channel; and (ii) receiving from the customer a selected customer-preference of digital-communication-channel.

According to some embodiments of the present disclosure, the notification module 190 may provide for example, via a Short Message Service (SMS), a shortened link to the computerized-device of the customer 170 to select available digital channels and the corresponding information e.g., the customer's selection, may be provided to the customer-identity-mapper module 160.

Figure 8:
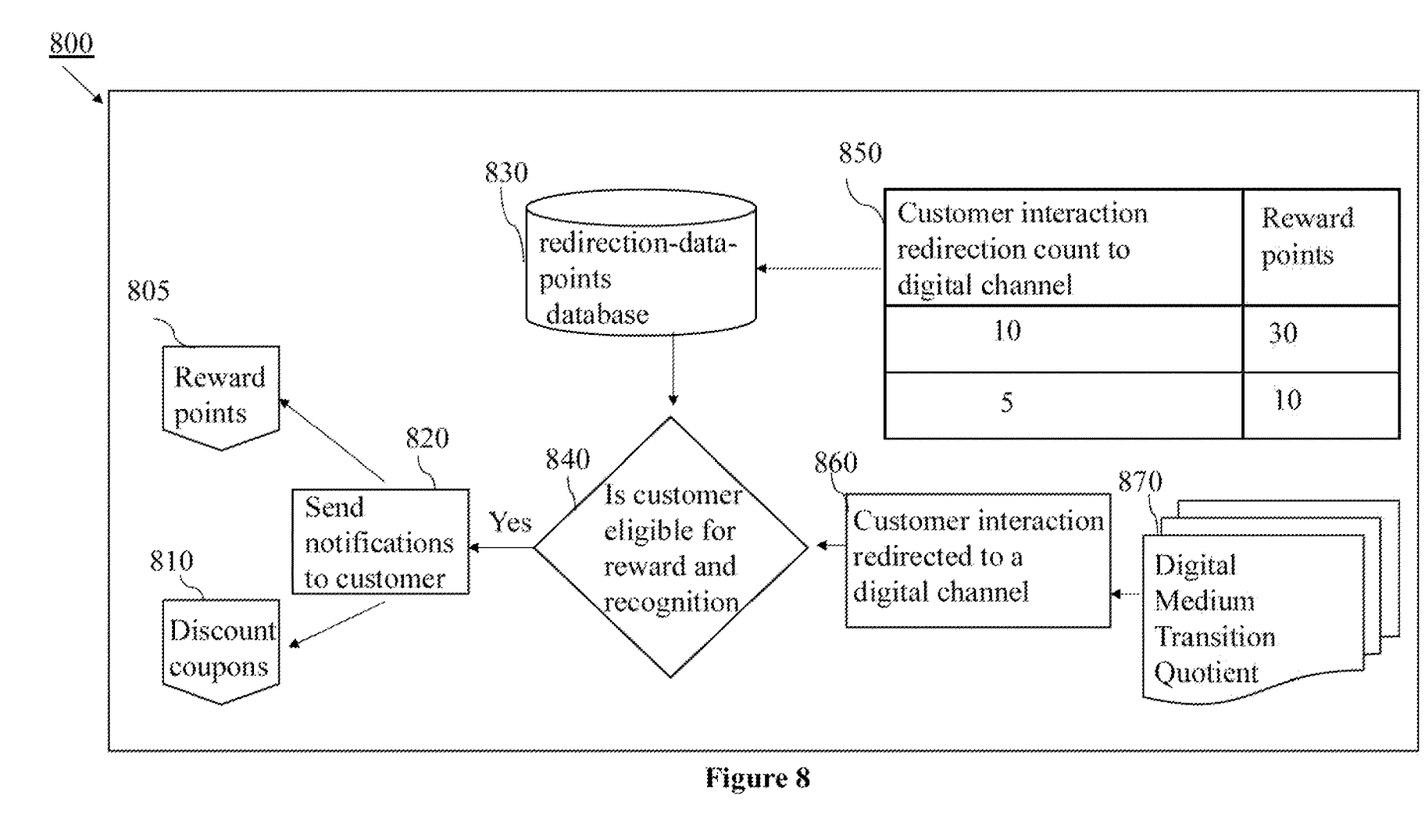
FIG. 8 shows a gamification module for rewards and recognition based on redirection of interactions to digital channels, in accordance with some embodiments of the present disclosure.

According to some embodiments of the present disclosure, a module, such as gamification module 180 may be operated, for example gamification module 800 in FIG. 8. The gamification module 180 may include: (i) adding a preconfigure number of points to a customer for a redirected voice-inbound-interaction to be stored in a redirection-data-points database, e.g., such as redirection-data-points database 830 in FIG. 8; and (ii) comparing a number of points of the customer to a preconfigured threshold to send a reward to the customer when the number of points is above the preconfigured threshold or discount coupons.

Figure 6:
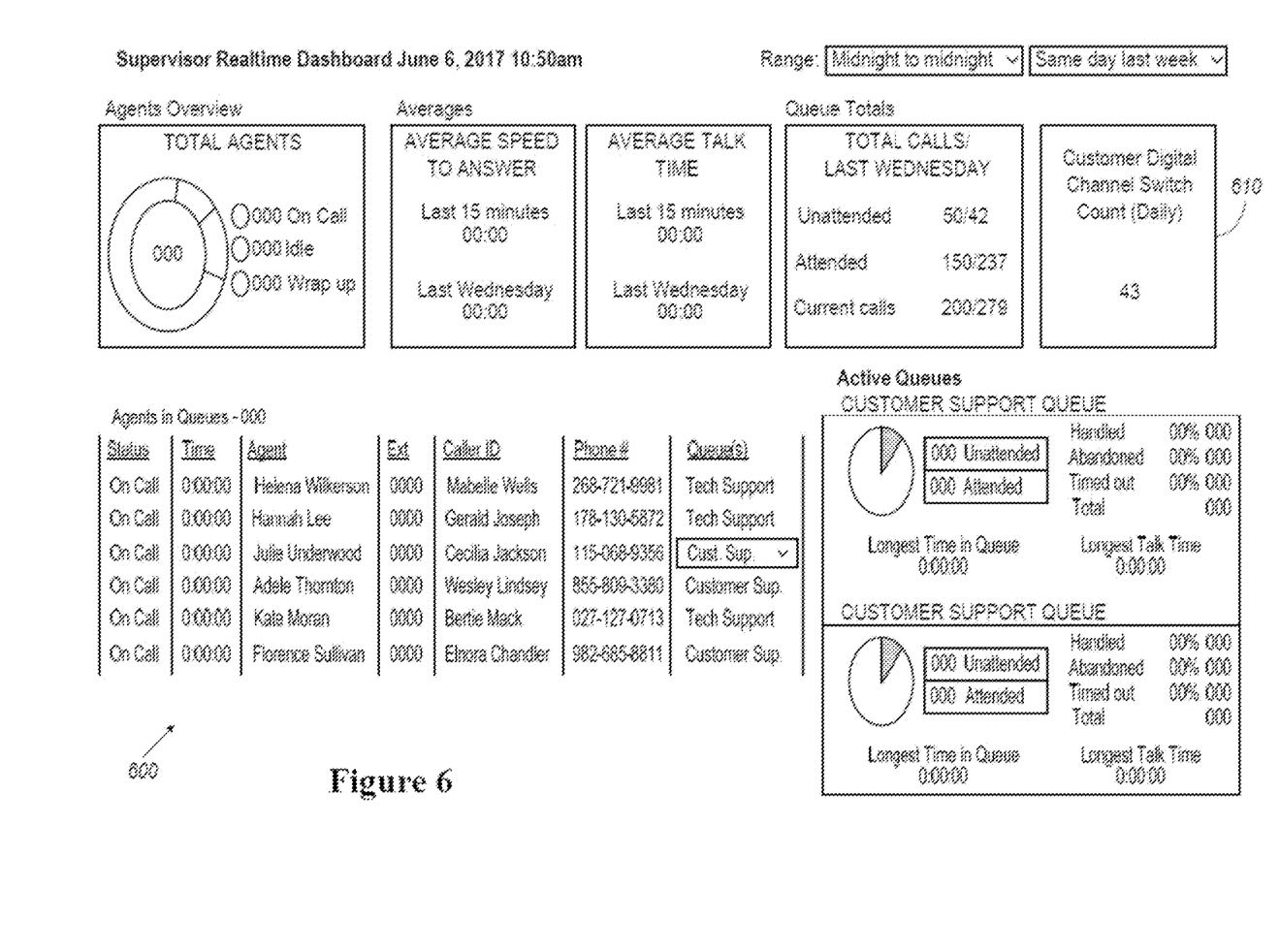
FIG. 6 illustrates an example of Graphic User Interface (GUI) presenting a number of calls redirected from voice channel to digital channels, in accordance with some embodiments of the present disclosure.

According to some embodiments of the present disclosure, a report may be generated upon user selection via a Graphical User Interface (GUI) associated to a user dashboard application to be presented on a user dashboard via a display unit, for example, as shown in GUI 600 in FIG. 6.

According to some embodiments of the present disclosure, the generated report may include at least one of: (i) number of voice-interactions redirected to a digital channel in a preconfigured period; (ii) percentage of redirected voice interactions to total inbound interactions during the preconfigured period; (iii) skillset associated to the determined digital-communication-channel, as shown for example, in FIG. 7.

According to some embodiments of the present disclosure, system 100B may be operated in a cloud computing environment and the DMTQ may be calculated for each tenant, based on licensing requirements. For some tenant or customer if the digital channel license is not enabled hence such customers cannot use digital channels. For example, if small and mid-size customers are still using hard phone, then for them digital channels license are not configured, and they need to purchase a license to utilize a digital channel.

FIG. 2 is a high-level workflow of a for a computerized-method for redirecting inbound-voice-interactions to digital channels, in a contact center 200, in accordance with some embodiments of the present disclosure.

According to some embodiments of the present disclosure, operation 210 comprising operating a digital-qualifier module to determine a digital-medium-transition-quotient, of an inbound-voice-interaction of a customer in an inbound-queue. The digital-medium-transition-quotient is an indication of a level of suitability of a digital-communication-channel to resolve a customer issue.

According to some embodiments of the present disclosure, the digital-qualifier module may be a module, such as digital-qualifier module 130 in FIGS. 1A-1B.

According to some embodiments of the present disclosure, operation 220 comprising operating an interaction-redirection module to determine a digital-communication-channel for redirection of the interaction, based on customer-preference and the determined digital-medium-transition-quotient.

According to some embodiments of the present disclosure, the interaction-redirection module may be a module such as interaction-redirection module 140 in FIGS. 1A-IB.

According to some embodiments of the present disclosure, operation 230 comprising forwarding the inbound-voice-interaction and the determined digital-communication-channel to an Automatic Call Distribution (ACD) system to be carried-out by an agent via the determined digital-communication-channel. The ACD system may be a system, such as ACD system 150 in FIGS. 1A-1B.

Figure 3:
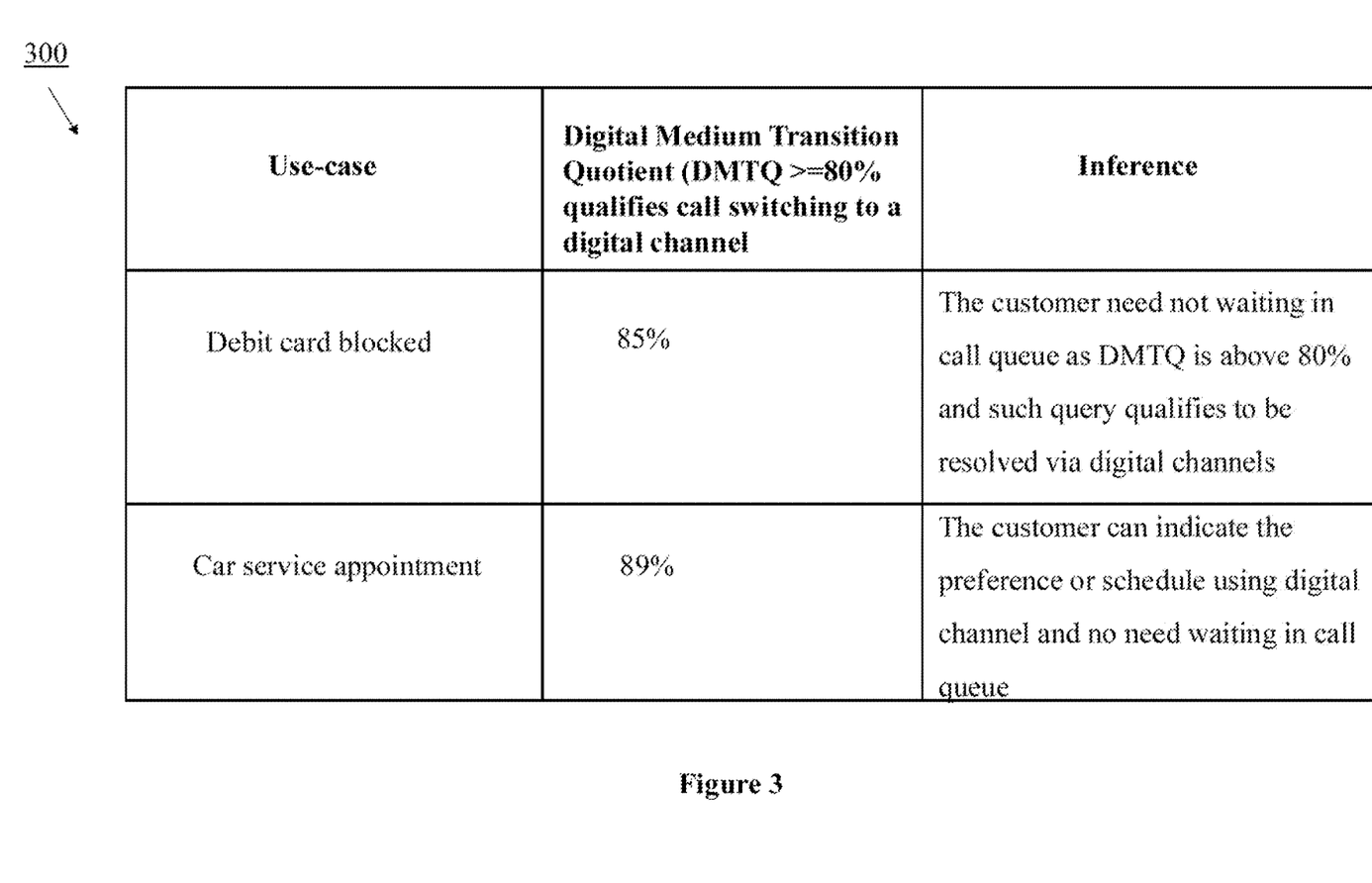
FIG. 3 shows an example of usage of Digital Medium Transition Quotient (DMTQ), in accordance with some embodiments of the present disclosure.

FIG. 3 shows an example 300 of usage of Digital Medium Transition Quotient (DMTQ), in accordance with some embodiments of the present disclosure.

According to some embodiments of the present disclosure, a module, such as digital-qualifier module 130 in FIGS. 1A-1B, may calculate a DMTQ of 85% for an inbound-voice interaction with a customer issue, such as debit card blocked. For example, when a preconfigured threshold for the DMTQ has been set as 80%, a DMTQ of 85% may signify that the customer need not to wait in a call queue, such as the inbound queue 110 in FIGS. 1A-1B, and the inbound-voice interaction may be qualified to be resolved using a digital channel.

According to some embodiments of the present disclosure, for example, when the digital skill tuple equals '1', meaning that there are agents having relevant skills in the contact center to resolve the issue in the inbound-interaction and the interaction tuple value is '17' (wait time equals '17' and the interaction context exists '1') and customer tuple equals '15', which the product of the parameters in formula II, then the DMTQ equals 85%.

According to some embodiments of the present disclosure, a module, such as digital-qualifier module 130 in FIGS. 1A-1B may calculate a DMTQ of 89% for an inbound-voice interaction with a customer issue, such as car service appointment. For example, when a preconfigured threshold for the DMTQ has been set as 80%, a DMTQ of 89% may signify that the customer need not to wait in a call queue, such as the inbound queue 110 in FIGS. 1A-1B, and the inbound-voice interaction may be qualified to be resolved using a digital channel.

Figure 4:
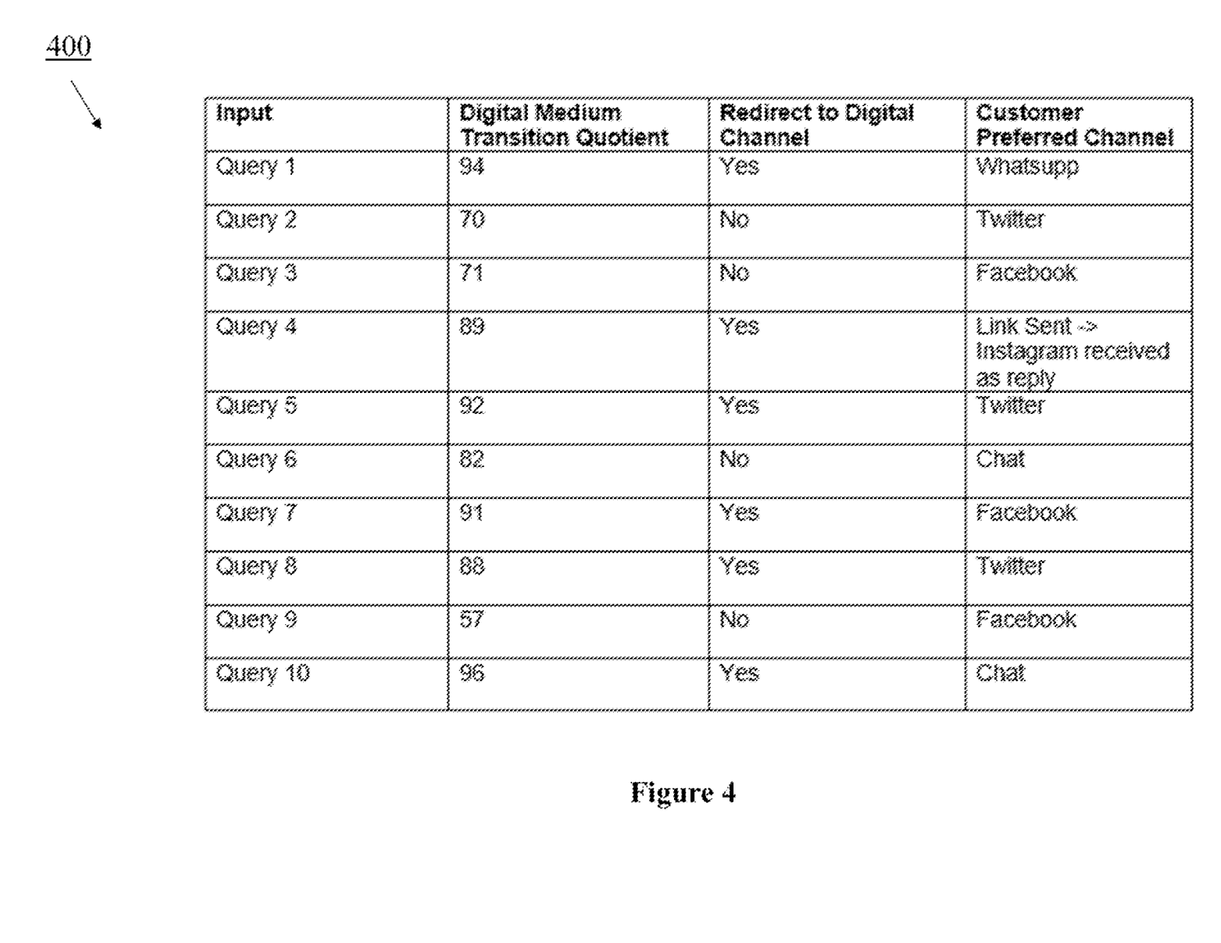
FIG. 4 is a table of simulation data of inbound-voice interactions, in accordance with some embodiments of the present disclosure.

FIG. 4 is a table 400 of simulation data of inbound-voice interactions, in accordance with some embodiments of the present disclosure.

According to some embodiments of the present disclosure, in a non-limiting example when a threshold for Digital Medium Transition Quotient (DMTQ) has been set to '80', a module, such as digital-qualifier module 130 in FIGS. 1A-1B may calculate a DMTQ of '94' then, the inbound-voice interaction may be redirected to a digital channel, e.g., to Whatsapp messenger, which is customer preference of digital channel, e.g., as stored in a file management system. When the digital-qualifier module 130 in FIGS. 1A-1B may calculate a DMTQ of '70' then, the inbound-voice interaction may not be redirected to a digital channel regardless of customer preference of digital channel Twitter messenger. When the digital-qualifier module 130 in FIGS. 1A-1B may calculate a DMTQ of '71' then, the inbound-voice interaction may not be redirected to a digital channel regardless of customer preference of digital channel Facebook messenger.

According to some embodiments of the present disclosure, when the digital-qualifier module 130 in FIGS. 1A-1B may calculate a DMTQ of '89' then, the inbound-voice interaction may be redirected to a digital channel that the customer has selected, e.g., Instagram via a notification module, such as notification module 190 in FIG. 1B. When the digital-qualifier module 130 in FIGS. 1A-1B may calculate a DMTQ of '92' then, the inbound-voice interaction may be redirected to a digital channel, such as Twitter messenger.

According to some embodiments of the present disclosure, when the digital-qualifier module 130 in FIGS. 1A-1B may calculate a DMTQ of '82' then, the inbound-voice interaction may not be redirected to a digital channel regardless of customer preference of digital channel chat. When the digital-qualifier module 130 in FIGS. 1A-1B may calculate a DMTQ of '91' then, the inbound-voice interaction may be redirected to a digital channel such as Facebook messenger.

According to some embodiments of the present disclosure, when the digital-qualifier module 130 in FIGS. 1A-1B may calculate a DMTQ of '88' then, the inbound-voice interaction may be redirected to a digital channel, such as Twitter messenger. When the digital-qualifier module 130 in FIGS. 1A-1B may calculate a DMTQ of '57' then, the inbound-voice interaction may not be redirected to a digital channel. When the digital-qualifier module 130 in FIGS. 1A-1B may calculate a DMTQ of '96' then, the inbound-voice interaction may be redirected to a digital channel, such as chat.

Figure 5:
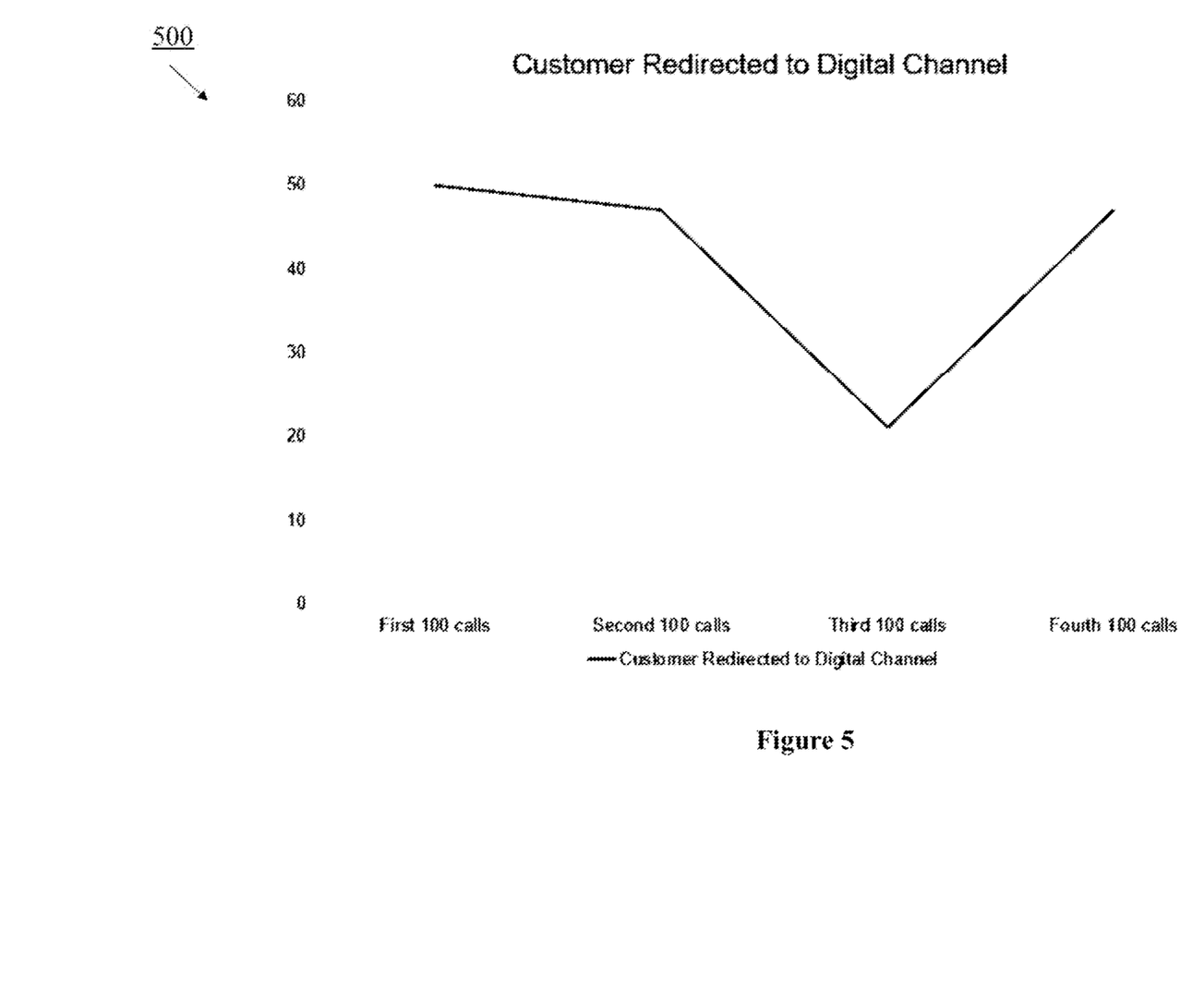
FIG. 5 is a graph showing digital adoption by customers, in accordance with some embodiments of the present disclosure.

FIG. 5 is a graph showing digital adoption by customers, in accordance with some embodiments of the present disclosure.

According to some embodiments of the present disclosure, a simulation ran on simulation data as to the number of calls which qualify e.g., has a DMTQ above a preconfigured value to be redirected to be carried out via a digital channel. The results gave indicated that almost 41% of the voice inbound-interactions have been redirected to be carried out via a digital channel.

FIG. 6 illustrates an example of Graphic User Interface (GUI) 600 presenting a number of calls redirected from voice channel to digital channels, in accordance with some embodiments of the present disclosure.

According to some embodiments of the present disclosure, a User Interface (UI) count on a supervisor dashboard may indicate the number of inbound-voice interactions redirected to digital channels 610.

Figure 7:
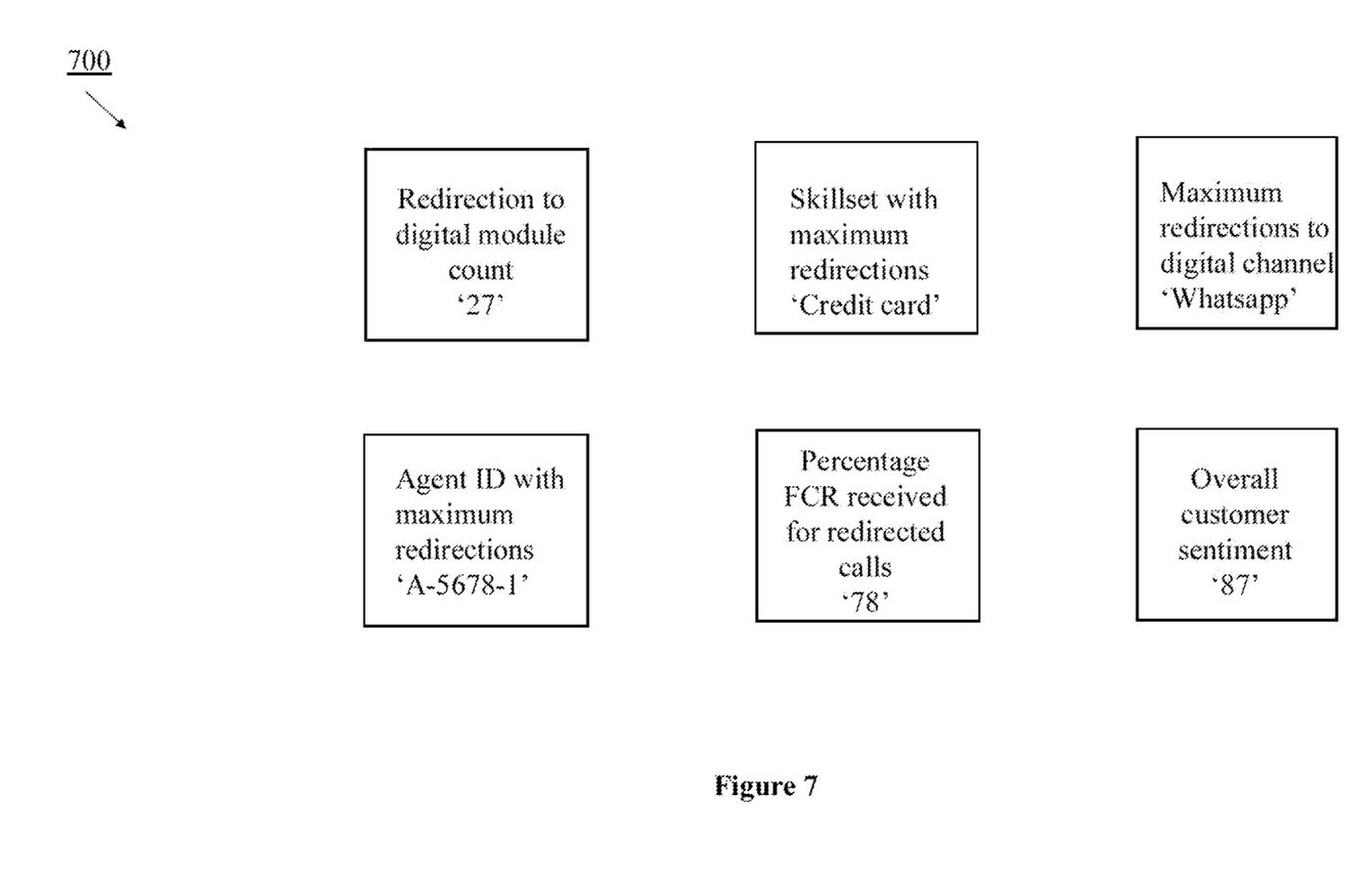
FIG. 7 shows an example of a user dashboard presenting interactions redirection details, in accordance with some embodiments of the present disclosure.

FIG. 7 shows an example of a user dashboard 700 presenting interactions redirection details, in accordance with some embodiments of the present disclosure.

According to some embodiments of the present disclosure, when operating a system such as system 100A in FIG. 1A or system 100B in FIG. 1B, a user dashboard may be presented to a user with details, such as, redirection to digital channel count '27' skill set with maximum redirection to digital channels, such as 'credit card', maximum redirections to a digital channel, such as 'Whatsapp', agent ID 'A-5678-1' who received the maximum voice interactions redirections, percentage First Call Resolution (FCR) received for redirected calls. e.g., 78%, and overall customer sentiment, e.g., '87'.

FIG. 8 shows a gamification module 800 for rewards and recognition based on redirection of interactions to digital channels, in accordance with some embodiments of the present disclosure.

According to some embodiments of the present disclosure, it is assumed that all redirected inbound-voice interactions received positive customer sentiment after the query resolution via the digital channel.

According to some embodiments of the present disclosure, a gamification module, such as gamification module 180 in FIG. 1B, may have metrics for rewards, e.g., as shown in table 850. For example, the metrics may be customer interaction redirection count to digital channel when reach '10' receives '30' reward points and when customer interaction redirection count to digital channel reach '5' receives '10' reward points.

According to some embodiments of the present disclosure, the gamification module may include: (i) adding a preconfigure number of points to a customer for a redirected voice-inbound-interaction to be stored in a redirection-data-points database 830; (ii) comparing a number of points of the customer to a preconfigured threshold, as shown in table 850 to send a reward to the customer 820.

According to some embodiments of the present disclosure, in a system such as system 100B in FIG. 1B, after a DMTQ 870 has been calculated and an inbound-voice-interaction and the determined digital-communication-channel has been forwarded to an Automatic Call Distribution (ACD) system to be carried-out by an agent via the determined digital-communication-channel when the determined digital-medium-transition-quotient is above a preconfigured threshold 860, a notification to the customer 820 may be sent.

According to some embodiments of the present disclosure, the notification may include reward points saved 805 or discount coupons 810 when the reward points have reached a preconfigured threshold, e.g., after a check if the customer is eligible for rewards and recognition 840.

According to some embodiments of the present disclosure, customer digital journey data store may contain all the required mappings of customer interaction redirection count to digital channel, reward points and discount coupons.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for redirecting inbound-voice-interactions to digital channels in a contact center, the computerized-method comprising:
    (i) operating a digital-qualifier module to determine a digital-medium-transition-quotient, of an inbound-voice-interaction of a customer in an inbound-queue, wherein said digital-medium-transition-quotient is an indication of a level of suitability of a digital-communication-channel to resolve a customer issue;
    (ii) operating an interaction-redirection module to determine a digital-communication-channel for redirection of the inbound-voice-interaction, based on customer-preference and the determined digital-medium-transition-quotient; and
    (iii) forwarding the inbound-voice-interaction and the determined digital-communication-channel to an Automatic Call Distribution (ACD) system to be carried-out by an agent via the determined digital-communication-channel when the determined digital-medium-transition-quotient is above a preconfigured threshold.

2. The computerized-method of claim 1, wherein the customer-preference is determined by a customer-identity-mapper module, said customer-identity-mapper module comprising retrieving customer-preference from a file management system.

3. The computerized-method of claim 2, wherein when there is no information as to customer preferences, operating a notification module, said notification module comprising: (i) sending a preference-selection message to the customer via a communication digital channel; and (ii) receiving from the customer a selected customer-preference of digital-communication-channel.

4. The computerized-method of claim 1, wherein the digital-medium-transition-quotient is calculated by formula I:

$$\text{digital-medium-transition-quotient} \propto \text{digital\_skill\_tuple} * \text{interaction\_tuple} * \text{customer\_tuple} \quad \text{(I)}$$

whereby:
interaction_tuple is calculated by formula II:

$$\text{interaction\_tuple} = \{\text{wait time, interaction context}\} = \prod_{i=1}^{n}(\text{Interaction tuple})i \quad \text{(II)}$$

whereby:
n is a number of parameters,
wait time is a length of time an inbound-interaction has to wait in an interaction queue before an agent answers the inbound-interaction,
interaction context is a boolean parameter that indicates if there is data related to the inbound-interaction, it's value is '1' when there is data and '0' otherwise,
customer_tuple is calculated by formula III:

$$\text{customer\_tuple} = \text{customer sentiment, customer segment, customer abandonment rate, customer ticket history, customer history on digital channels}\} = \prod_{i=1}^{n}(\text{CustomerTouple})i \quad \text{(III)}$$

whereby:
n is a number of parameters,
customer sentiment is a score of last inbound-voice-interaction responded in the contact center,
customer segment is a customer priority,
customer abandonment rate is a percentage of customer inbound-voice-interactions which have been abandoned from the inbound-queue during a preconfigured period,
customer ticket history is a number of times the customer has approached the contact center to resolve the customer issue of the inbound-voice-interaction,
customer history on digital channels is a level of success of previous customer inbound-voice-interactions,
digital_skill_tuple is calculated by formula V:

$$\text{Digital skill Tuple} = \begin{cases} 1; & \text{relevant agents skills available} \\ 0; & \text{otherwise} \end{cases} \quad \text{(IV)}$$

whereby:
relevant agents skills available indicates if there are available agents having relevant skills to the interaction context.

5. The computerized-method of claim 1, wherein the computerized-method is further comprising operating a gamification module.

6. The computerized-method of claim 5, wherein said gamification module comprising: (i) adding a preconfigure number of points to a customer for a redirected voice-inbound-interaction to be stored in a redirection-data-points database; (ii) comparing a number of points of the customer to a preconfigured threshold to send a reward to the customer when the number of points is above the preconfigured threshold.

7. The computerized-method of claim 1, wherein the computerized-method is further comprising generating a report upon user selection via a Graphical User Interface (GUI) associated to a user dashboard application to be presented on a user dashboard via a display unit.

8. The computerized-method of claim 7, wherein said generated report includes at least one of: (i) number of voice-interactions redirected to a digital channel in a preconfigured period; (ii) percentage of redirected voice interactions to total inbound interactions during the preconfigured period; (iii) skillset associated to the determined digital-communication-channel.

9. The computerized-method of claim 1, wherein a forwarded inbound-voice-interaction an ACD system to be carried-out by an agent via the determined digital-communication-channel is tagged as 'redirected to digital channel' in a file management system.

10. A computerized-system for redirecting inbound-voice-interactions to digital channels in a contact center, the computerized-system comprising:

one or more processors:
a memory to store one or more databases thereon,
for each inbound-voice-interaction of a customer in an inbound-queue, said one or more processors are configured to:
(i) operate a digital-qualifier module to determine a digital-medium-transition-quotient,
    wherein said digital-medium-transition-quotient is an indication of a level of suitability of a digital-communication-channel to resolve a customer issue;
(ii) operate an interaction-redirection module to determine a digital-communication-channel for redirection of the inbound-voice-interaction, based on customer-preference and the determined digital-medium-transition-quotient; and
(iii) forward the inbound-voice-interaction and the determined digital-communication-channel to an Automatic Call Distribution (ACD) system to be carried-out by an agent via the determined digital-communication-channel when the determined digital-medium-transition-quotient is above a preconfigured threshold.

* * * * *